United States Patent
Asher

(10) Patent No.: US 8,392,910 B1
(45) Date of Patent: Mar. 5, 2013

(54) STOCHASTIC METHOD FOR PROGRAM SECURITY USING DEFERRED LINKING

(75) Inventor: Michael L. Asher, Green Cove Springs, FL (US)

(73) Assignee: AT & T Intellectual Property II, LLP, Atlanta, GA (US)

( * ) Notice: Subject to any disclaimer, the term of this patent is extended or adjusted under 35 U.S.C. 154(b) by 1345 days.

(21) Appl. No.: 11/733,538

(22) Filed: Apr. 10, 2007

(51) Int. Cl.
*G06F 9/44* (2006.01)

(52) U.S. Cl. ...................................... 717/174

(58) Field of Classification Search .......... 717/174–177; 713/189
See application file for complete search history.

(56) References Cited

U.S. PATENT DOCUMENTS

| | | | | |
|---|---|---|---|---|
| 2005/0198388 A1* | 9/2005 | Teodosiu et al. | ............... | 709/245 |
| 2005/0210275 A1* | 9/2005 | Homing et al. | ............... | 713/190 |
| 2007/0061594 A1* | 3/2007 | Ginter et al. | ............... | 713/189 |
| 2007/0083628 A1* | 4/2007 | Sandstrom | ................... | 709/223 |
| 2007/0201502 A1* | 8/2007 | Abramson | ................... | 370/429 |
| 2007/0271191 A1* | 11/2007 | Torrubia-Saez | .............. | 705/59 |
| 2009/0249492 A1* | 10/2009 | Boesgaard Sorensen | ...... | 726/27 |

* cited by examiner

*Primary Examiner* — Anna Deng
(74) *Attorney, Agent, or Firm* — Fay Kaplun & Marcin, LLP

(57) ABSTRACT

A method to install software by receiving a partially linked version of the software including a plurality of code modules, randomly ordering the code modules, assigning non-volatile memory addresses for the software and generating an executable image of the software. A system to install a software application having a partially linked object code version of the software application including a plurality of code modules and an installation program configured to randomly order the code modules, assign non-volatile memory addresses for the software, and generate an executable image of the software, wherein the installation program performs the ordering, assigning, and generating on a target computing device that is different from a development computing device that partially linked the software application.

12 Claims, 3 Drawing Sheets

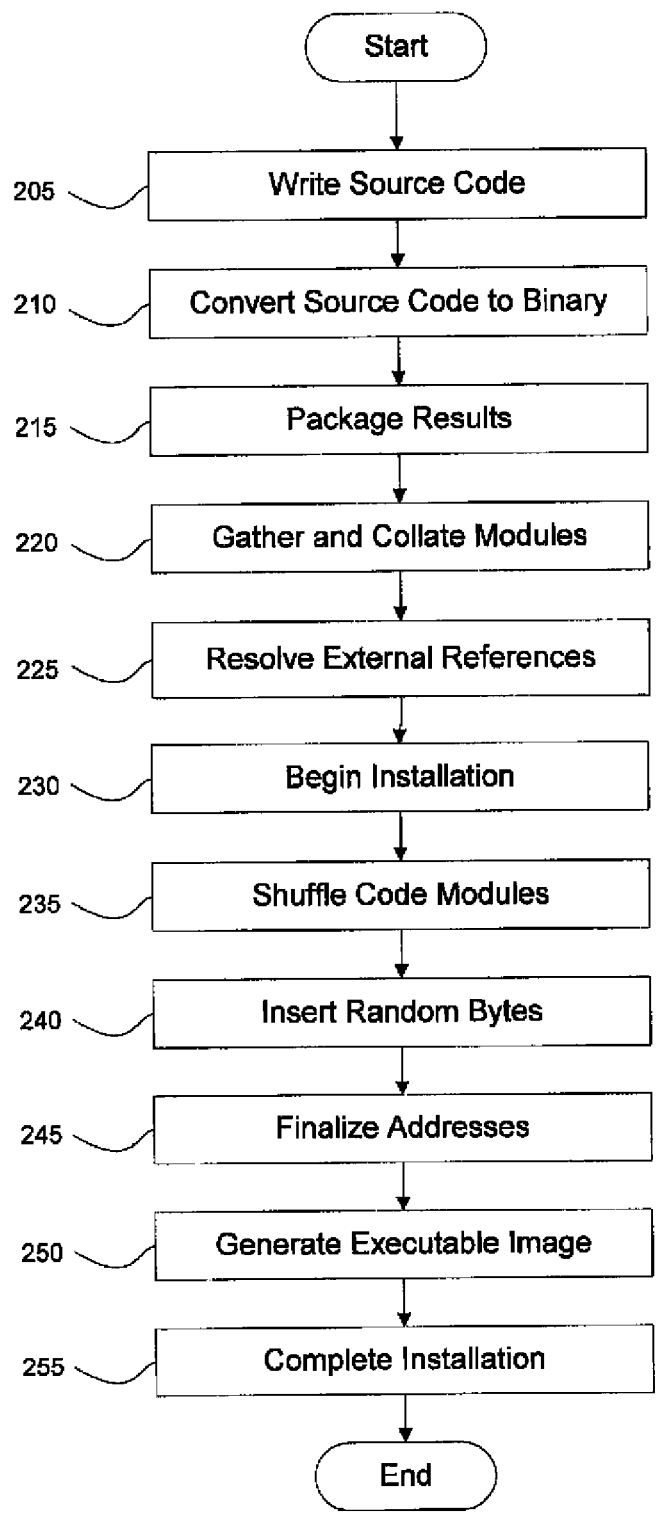

| Code Module 10 | Code Module 20 | Code Module 30 | Code Module 40 | Code Module 50 | Code Module 60 |

STOCHASTIC METHOD FOR PROGRAM SECURITY USING DEFERRED LINKING

BACKGROUND

Computer systems are often the target of attacks in the form of viruses, worms, and other forms of hacker attacks. Recovery from such attacks can be costly and time-consuming, and occasionally important or valuable data may be permanently lost. It is therefore desirable to constantly improve security measures taken to prevent such attacks.

One type of hacker attack is known as an image corruption attack. A hacker can learn intimate details about typical software to be attacked by analyzing the in-memory image of the same software installed on their own local computer. Because the memory image exactly matches that of every other system running the software, the attack becomes viable.

Vulnerability to such attacks is typically viewed as the result of a coding error by the programmer(s) of an application or operating system. As a result of this view, system security must be accomplished by preventing such coding mistakes, or by repairing them (e.g. via software updates, typically referred to as "patches") after they are discovered.

This approach to security, however, has drawbacks. Prevention of such coding mistakes adds to the complexity and labor requirements of the programming process. Preparation of patches to repair coding mistakes requires additional labor and may not be completed until after hacker attacks have already occurred.

SUMMARY OF THE INVENTION

A method to install software by receiving a partially linked version of the software including a plurality of code modules, randomly ordering the code modules, assigning non-volatile memory addresses for the software and generating an executable image of the software.

A system to install a software application having a partially linked object code version of the software application including a plurality of code modules and an installation program configured to randomly order the code modules, assign non-volatile memory addresses for the software, and generate an executable image of the software, wherein the installation program performs the ordering, assigning, and generating on a target computing device that is different from a development computing device that partially linked the software application.

DESCRIPTION OF THE DRAWINGS

FIG. 2 shows an exemplary method of creating a unique software image according to the present invention.

DETAILED DESCRIPTION

Figure 1:
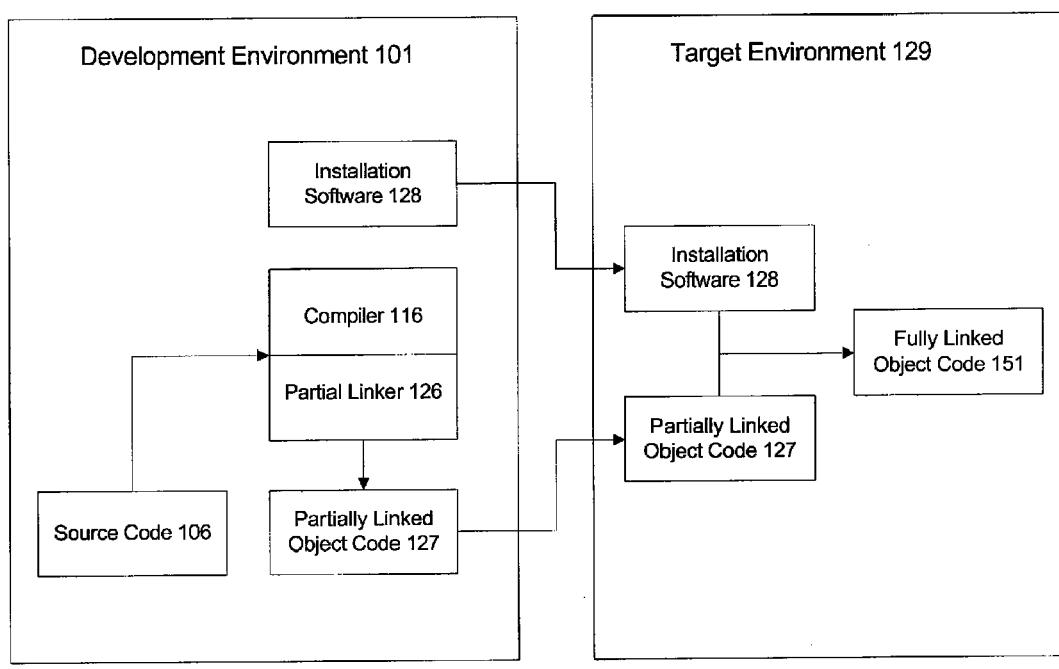
FIG. 1 shows a schematic view of an exemplary development environment where software is developed and an exemplary target environment where the software is loaded according to the present invention.

The present invention may be further understood with reference to the following description and the appended drawings, wherein like elements are referred to with the same reference numerals. The exemplary embodiment of the present invention describes a system and method for preparing and installing software in a manner that will prevent image corruption attacks. The exemplary embodiments create a unique image each time a software application is loaded onto a target device. The exemplary system and method will be further discussed in detail below.

It is noted that the terms "software," "software application," "application" and "program" are used throughout this description to refer to lines of code that may be executed by a processor to accomplish a task on a computing device. These lines of code may be in any form that is useful for executing on the computing device (e.g., object code, etc.). Furthermore, the terms "computing device" and "computer" are used to refer to any hardware device including a processor that may execute software (e.g., a desktop computer, a laptop computer, a mobile computer, a personal digital assistant ("PDA"), a mobile phone, an embedded computing device, etc.).

Software which has been compiled and installed using a standard method is vulnerable to image corruption attacks. After software is written, the source code is converted into binary-level instructions. The binary instructions are then packaged into separate modules and/or object files. This process of converting and packaging the source code is typically referred to as the "compiling" phase of programming.

After compiling, the code modules are gathered together and collated. Next, any external references are resolved. External references may be, for example, to a library and/or DLL files. After resolving external references, all memory and code addresses are finalized (the finalization process is typically referred to as "relocation"). Finally, an executable on-disk image is generated. The above steps are typically referred to as the "link" process.

Once linking has been performed, installation of the executable image onto the target system begins; all that is required is to copy the executable image onto the target system. Because all preparation of the image, along with memory addresses, code modules, locations of code modules, etc., is performed during programming, prior to beginning the process of installation on the target system, the on-disk image is identical for every copy of the software. This homogeneity makes image corruption attacks possible. To plan and execute such an attack, the attacker relies on a "mirror stack," an installed image of the program located on the attacker's system that is identical to those installed on other computer systems.

FIG. 2, therefore, shows a method 200 of preparing and installing a software application that eliminates this flaw. The method 200 of FIG. 2 will be described with reference to the exemplary environments of FIG. 1. The exemplary method 200 begins similarly to the standard software development and installation method described above. The first portion of the method 200 is performed in the development environment 101. Those skilled in the art will understand that the development environment may be any type of environment (e.g., an Integrated Development Environment (IDE), etc.) that may reside on a single host computing device or be distributed to multiple host devices so that multiple developers may simultaneously work on a project.

In step 205, source code 106 is written. This step may be performed using any of the various programming languages known in the art (e.g., C, C++, Visual Basic, etc.). In step 210, the source code is converted into binary-level instructions. In step 215, the binary instructions are packaged into separate modules and/or object files. These two compiling steps are substantially the same as the standard compiling process discussed above; they are performed in the development environment 101 by software compiler 116, which may be any standard compiler appropriate for use with the programming language in which the source code 106 has been written.

In step 220, the modules are gathered and collated. In step 225, all external references are resolved. These two steps, collectively, are performed by partial linker 126 within development environment 101. All steps up to and including step 225 are performed during the coding process within development environment 101; the output of these steps is partially linked object code 127. The partially linked object code 127, together with installation software 128, may comprise the software provided to the user. The use of the partially linked object code 127 and the installation software 128 will be described in detail below.

Step 230 and subsequent steps are performed on the target environment 129. The target environment 129 is intended to designate any computing device onto which the executable software application is to be loaded. In step 230, installation on the target system begins (e.g., by running installation software 128 which is included with a copy of the software application). In step 235, the locations of code modules and data symbols within the on-disk image of the software application are shuffled randomly. In step 240, small amounts of random bytes are inserted between code modules to further randomize the memory image. After this randomization has occurred, non-volatile memory and code addresses are finalized in step 245. It should be noted that the term "non-volatile memory" is used to refer to memory in, for example, an on-disk image, as opposed to "volatile memory," which may refer to, for example, random access memory (RAM). Because references from one part of the code to another are not completed until this step, the randomization and insertion of extra bytes have no effect on the functionality or performance of the installed software. However, because of this randomization, a copy of the software installed on an attacker's computer will have a memory image that is completely different from a copy installed on another computer. As a result of this variance, the attacker cannot learn the locations of specific objects (e.g., global or local variables, code fragments, external references, etc.) within all copies of a given program, and plan attacks on that basis, because such attacks must be based on knowledge of the memory structure of a specific copy of a program installed on a specific target environment 129.

In step 250, the executable fully linked object code 151 of the program is written to the local disk of the target environment 129. In step 255, the installation process terminates. Shifting the time for performance of step 245 and the addition of steps 235 and 240 results in a substantially negligible increase in the amount of time taken by the installation process; the bulk of the compile-link process is in generating and optimizing output code, and in searching external libraries to resolve references. The process of ordering object modules and relocating symbols, while necessary, is essentially trivial in terms of complexity and time. Step 240, wherein random bytes are inserted between modules, has only a small memory implication, on the order of less than a one percent increase in the size of the final disk image, and also is essentially trivial in terms of complexity and time added to the installation process.

Thus, the installation software 128 that is provided with the software application (e.g., included on a CD containing the software application, downloaded with the software application, etc.) includes the functionality to perform one or more of the steps 230-255 on the target environment 129. The installation program 128 includes some of the functionality that is included in a traditional compiler/linker that is located in the development environment, such as the functionality to finalize addresses (step 245) and to generate an executable image (step 250). However, the installation program 128 moves these functionalities from the development environment 101 to the target environment 129. In addition, the installation software 128 includes the functionality to perform the shuffling of code modules (step 235) and the insertion of random bytes between the code modules (step 240). Those skilled in the art will understand that the installation program 128 may also include other functionalities to aid the user in installing the software application in the target environment 129.

Figures 3A, 3B:
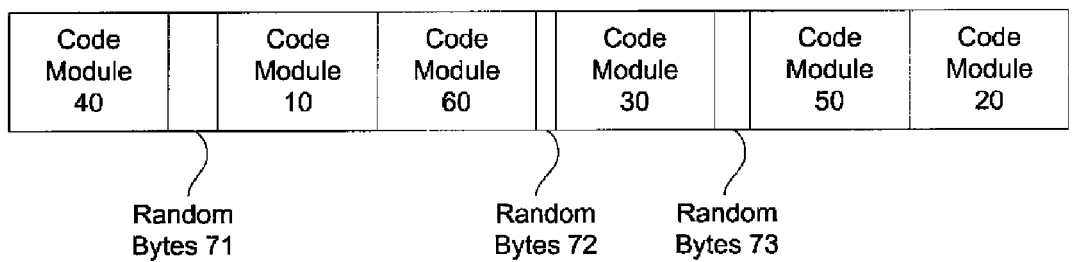
FIGS. 3a and 3b show an exemplary set of code modules comprising a software application, shown before and after randomization to create a unique image according to the present invention.

FIGS. 3a and 3b illustrate an exemplary on-disk software image with and without application of the exemplary method discussed above. As seen in FIG. 3a, software written and installed using traditional methodology will have its code modules in a set order as defined by the linker used to link the software. Most significantly, the order of code modules 10, 20, 30, 40, 50 and 60 will be the same on every computer where the software is installed. Each code module, and any variables which may be contained therein, will be located at a set point in memory, and at a set point with respect to all the other code modules.

FIG. 3b illustrates the same software of FIG. 3a after it has been installed in a target environment 129 using exemplary method 200. Code modules 10, 20, 30, 40, 50 and 60 have been shuffled in accordance with step 235 of exemplary method 200, and are located in random order. It should be noted that, while FIG. 3b indicates that the code modules are located in the revised order of 40, 10, 60, 30, 50, 20, this order is solely intended to be an exemplary result of a random shuffle of the code modules, and would vary for each separate installation of the software into a target environment 129. It should also be noted that complex modern software typically includes a significantly larger number of code modules than those shown in FIGS. 3a and 3b; with more code modules present, there will naturally be more variation among the shuffled arrangements of the code modules, resulting in further increases in security.

Additionally, FIG. 3b shows the addition of random bytes 71, 72, and 73 at various locations between code modules. These random bytes are inserted in accordance with step 240 of the exemplary method 200. As above, the presence of three groups of random bytes 71, 72 and 73 in FIG. 3b, and their apparent sizes relative to one another and to that of the code modules, is only exemplary; FIG. 3b is not intended to be drawn to scale. Also, as discussed above, the number of groups of random bytes, and the sizes of the groups, will vary for each installation of the software into a target environment 129, further randomizing the on-disk image.

The exemplary embodiments provide a high degree of security against any attack that relies upon knowing the memory location of a global variable or other symbol, the location of a code module, the offset of one code module with respect to another, or the specific ordering of local variables on the stack. This approach may be combined with other, similar stochastic methods to further enhance security.

The final result of the above exemplary process is an executable file that contains a highly randomized version of the original application, capable of frustrating a large variety of memory-based attacks. For a commercial application containing a large number of modules and symbols, the result is an essentially unique copy for each installation, with the randomized versions performing identically to the original, unmodified code.

In another exemplary embodiment, the method 200 may be performed as an intermediate method for installing software in a target environment. For example, a user of a PDA may desire to install a new software application on the device. In this case, the installation process may include the user downloading the partially linked object code 127 and the installation software 128 to the user's desktop computer, where the code modules are shuffled (step 235), the random bytes are inserted (step 240), and the executable image is generated (step 250). The final step 255 of completing the installation may be the porting of the executable image from the desktop to the PDA. In this embodiment, there would be two identical images of the software (e.g. on the desktop and on the PDA). However, both of these devices belong to the same user and the user has no desire to hack into their own device. In addition, this exemplary embodiment may be useful for those computing devices that do not include sufficient processing and/or memory capabilities to perform the installation method (e.g., embedded computing devices). Using this exemplary method, such lower-capability computing devices may still benefit from the present invention.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method to install software, comprising:
   receiving, by an installer, a partially linked object code version of the software including a plurality of code modules, wherein the partially linked object code version of the software has at least a portion of external references resolved;
   randomly ordering the code modules, by the installer;
   inserting a random number of bytes between all of the ordered code modules;
   assigning, by the installer, non-volatile memory addresses for the software; and
   generating, by the installer, an executable image of the software that is unique to a local system,
   wherein the steps of randomly ordering the code modules, inserting the random number of bytes, assigning the non-volatile memory addresses and generating the executable image are performed during a software installation process.

2. The method of claim 1, further comprising:
   storing the executable image to a hard drive.

3. The method of claim 1, further comprising:
   copying the executable image of the software to a mobile computing device.

4. The method of claim 3, wherein the mobile computing device is one of a PDA and a mobile telephone.

5. The method of claim 1, further comprising:
   copying the executable image of the software to an embedded computing device.

6. A system to install a software application, the system comprising:
   a non-transitory memory storing a partially linked object code version of the software application including a plurality of code modules, wherein the partially linked object code version of the software application has at least a portion of external references resolved; and
   an installation program configured to:
      randomly order the code modules,
      insert a random number of bytes between all of the ordered code modules;
      assign non-volatile memory addresses for the software, and
      generate an executable image of the software that is unique to a local system,
   wherein the installation program performs the ordering, assigning, and generating on a target computing device that is different from a development computing device that partially linked the software application, and
   wherein the installation program performs the ordering, inserting, assigning, and generating during a software installation process.

7. The system of claim 6, wherein the installation program is further configured to:
   store the executable image to a hard drive.

8. The system of claim 6, wherein the target computing device is one of a desktop computer, a laptop computer, a mobile computing device and an embedded computing device.

9. The system of claim 6, wherein the partially linked object code and the installation program are provided to users on one of an optical media and a magnetic media.

10. The system of claim 6, wherein the partially linked object code and the installation program are downloaded by users via a computer network.

11. A non-transitory computer readable storage medium including a set of instructions executable by a processor, the set of instructions performing a method comprising:
   receiving, by an installer, a partially linked object code version of a software application including a plurality of code modules, wherein the partially linked object code version of the software application has at least a portion of external references resolved;
   randomly ordering the code modules, by the installer;
   inserting random numbers of bytes between all of the ordered code modules;
   assigning, by the installer, non-volatile memory addresses for the software; and
   generating, by the installer, an executable image of the software that is unique to a local system,
   wherein the instructions to randomly order the code modules, insert random numbers of bytes, assign the non-volatile memory addresses and generate the executable image are performed during a software installation process.

12. The non-transitory computer readable storage medium of claim 11, wherein the method further comprises:
   storing the executable image to a hard drive.

* * * * *